(12) United States Patent
Joyce et al.

(10) Patent No.: US 7,309,418 B2
(45) Date of Patent: Dec. 18, 2007

(54) WATER CONTAMINANT INDICATORS

(75) Inventors: Patrick C. Joyce, Oakland, CA (US);
Toni L. Lynch, Oakland, CA (US);
Edward B. Rinker, Oakland, CA (US)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 11/460,538

(22) Filed: Jul. 27, 2006

(65) Prior Publication Data

US 2006/0260990 A1   Nov. 23, 2006

Related U.S. Application Data

(63) Continuation of application No. 10/723,047, filed on Nov. 26, 2003, now abandoned.

(51) Int. Cl.
*B01D 35/14* (2006.01)

(52) U.S. Cl. .......... 210/95; 210/264; 210/256; 210/335; 210/464; 210/473; 222/189.06; 222/189.08

(58) Field of Classification Search ........ 210/94, 210/95, 264, 266, 282, 456, 464–469, 473–482, 210/335–338, 503–505; 55/486–489; 435/297.5, 435/304.1; 222/189.06, 189.08
See application file for complete search history.

(56) References Cited

U.S. PATENT DOCUMENTS

| | | | | |
|---|---|---|---|---|
| 1,411,975 A | * | 4/1922 | Matson | 210/491 |
| 4,504,389 A | * | 3/1985 | Rundzaitis | 210/266 |
| 4,770,768 A | * | 9/1988 | Lang | 210/94 |
| 5,076,912 A | * | 12/1991 | Belz et al. | 210/94 |
| 5,595,659 A | * | 1/1997 | Huang et al. | 210/502.1 |
| 6,221,416 B1 | * | 4/2001 | Nohren, Jr. | 426/394 |
| 7,125,434 B2 | * | 10/2006 | Yavorsky et al. | 55/486 |
| 2004/0029266 A1 | * | 2/2004 | Barbera-Guillem | 435/297.5 |

* cited by examiner

*Primary Examiner*—Joseph Drodge
(74) *Attorney, Agent, or Firm*—Ann M. Lee (57) ABSTRACT

A filtering device for a gravity-flow liquid treatment system includes a first filter component that can be either exposed or adjacent to a substantially transparent region in at least a portion of a filter housing. The first filter component is capable of providing a visual indication of exposure to at least one contaminant. The contaminants for which the first filter component can indicate exposure include particles, inorganic, and organic contamination. Particle contamination is indicated by a change in color of the first filter component through particle collection. Inorganic and organic contaminants are indicated by reaction with at least one agent capable of undergoing a color-change reaction in response to at least one contaminant. Water treatment systems and filtration devices that include at least one agent capable of undergoing a color-change reaction and thus give a visual indication of exposure to at least one contaminant for use in both gravity-driven and pressure-driven environments are also described.

23 Claims, 9 Drawing Sheets

WATER CONTAMINANT INDICATORS

BACKGROUND OF THE INVENTION

1. Field of the Invention

This invention relates to a device for filtering liquids. In particular, this invention relates to replaceable filters for use in water treatment systems.

2. Description of the Related Art

Unwanted and potentially harmful contamination in water, especially drinking water, is of concern to many people. This concern creates a desire for water treatment devices in the home and elsewhere. Many water treatment devices and methods have been developed to remove or neutralize particulate and chemical contaminants.

Water treatment devices are well known in the art. These devices can be employed directly in a water system, either in-line or at a terminal end, or also in self-contained batch systems. An example of an in-line system is an under-the-counter device that filters water in the source line before it reaches the faucet. Terminal end devices include countertop and faucet-mounted filtration systems. These systems rely on pressure in the water system to drive water through the filtration device. Self-contained batch systems typically have upper and lower chambers separated by a filter cartridge, all within a pitcher or carafe. They rely on gravity to move water from the upper chamber, through the cartridge, and into the lower chamber, thereby producing treated water.

Typically, water treatment devices employ mechanical filtration and/or chemical treatment. Mechanical filters treat water by preventing passage of particulates. Chemical treatment) employs processes such as adsorption and ion exchange for removing undesirable chemical species. Many common chemical treatment devices use activated carbon-based and ion exchange media either in block form or as loose media in a container.

Some consumers are reluctant to change a water treatment device unless they have some indication that the device is "used up". As a mechanical filter approches the end of its useful life, restricted flow due to particulate accumulation can provide a ready indication that filter replacement is necessary. A major drawback associated with chemical treatment is that the chemical treatment medium eventually becomes inactive, yet provides no direct indication that its useful life is over.

Consumers are more satisfied with a product when they have direct evidence that the product is functioning. Although chemical treatment provides additional water purification not possible with mechanical filtration alone, it is difficult for consumers to have an indication that these systems are working actively except, of course, by the subjective taste of the treated water.

Some methods have been employed to provide a visual indication of particulate filtration on pressure-driven water treatment systems. One method is disclosed by Lang in U.S. Pat. No. 4,686,037, wherein a user can compare the color of a pre-filter on a faucet-mounted water filter with a reference strip as an indication of particulate collection.

Indication of chemical species removal has been more elusive. For example, activated carbon can remove undesirable tastes and odors from water as well as chlorine and other reactive chemicals. Ion exchange resins are useful for removing metal and other ions. Many consumers are not aware of the specific chemical contaminants in their tap water. Although current water treatment devices may be successful in removing these contaminants, a consumer has no direct indication of what has been removed. An indicator of specific chemical contaminants in the untreated water, which contamination can be removed by the treatment device, would aid greatly in increasing customer satisfaction with water treatment systems.

Accordingly, there is a need for improved materials for filter components that allow gravity-fed water treatment devices to give consumers a particle contaminant indicator that was heretofore possible only on pressure-driven water treatment systems. There is a further need to increase consumer satisfaction with water treatment systems by providing an indication of specific chemical contaminant removal.

SUMMARY OF THE INVENTION

A gravity-flow liquid treatment system that includes a filter device capable of providing a user with a visual indication of device exposure to at least one contaminant is described. The system provides a sufficient liquid flow rate through the filter device with a liquid head pressure of less than about 1.0 psi or less than about 0.5 psi.

The filtering device for the gravity-flow liquid treatment system includes a first filter component that can be either exposed or adjacent to a substantially transparent region in at least a portion of a filter housing. The first filter component is capable of providing a visual indication of exposure to at least one contaminant. The contaminants for which the first filter component can indicate exposure include particles, inorganic, and organic contamination. Particle contamination is indicated by a change in color of the first filter component through particle collection. Inorganic and organic contamination are indicated by reaction with at least one agent capable of undergoing a color-change reaction in response to at least one contaminant.

Water treatment systems and filtration devices that include at least one agent capable of undergoing a color-change reaction and thus give a visual indication of exposure to at least one contaminant for use in both gravity-driven and pressure-driven environments are also provided.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

The preferred embodiments are illustrated in the context of water treatment devices in gravity-flow and pressure-driven systems. The skilled artisan will readily appreciate, however, that the materials and methods disclosed herein will have application in a number of other contexts where liquid purification is desirable, particularly where customer satisfaction is important.

These and other objects and advantages of the present invention will become more fully apparent from the following description taken in conjunction with the accompanying drawings.

Major categories of consumer water filtration systems include: 1) plumbed-in or faucet-mounted systems that rely on the pressure of the water supply as the driving force for filtration; and 2) non-plumbed, pour-though or batch systems that rely on gravity to move water from an upper influent water chamber, through a filtering means and down to a lower effluent water chamber.

Figure 1:
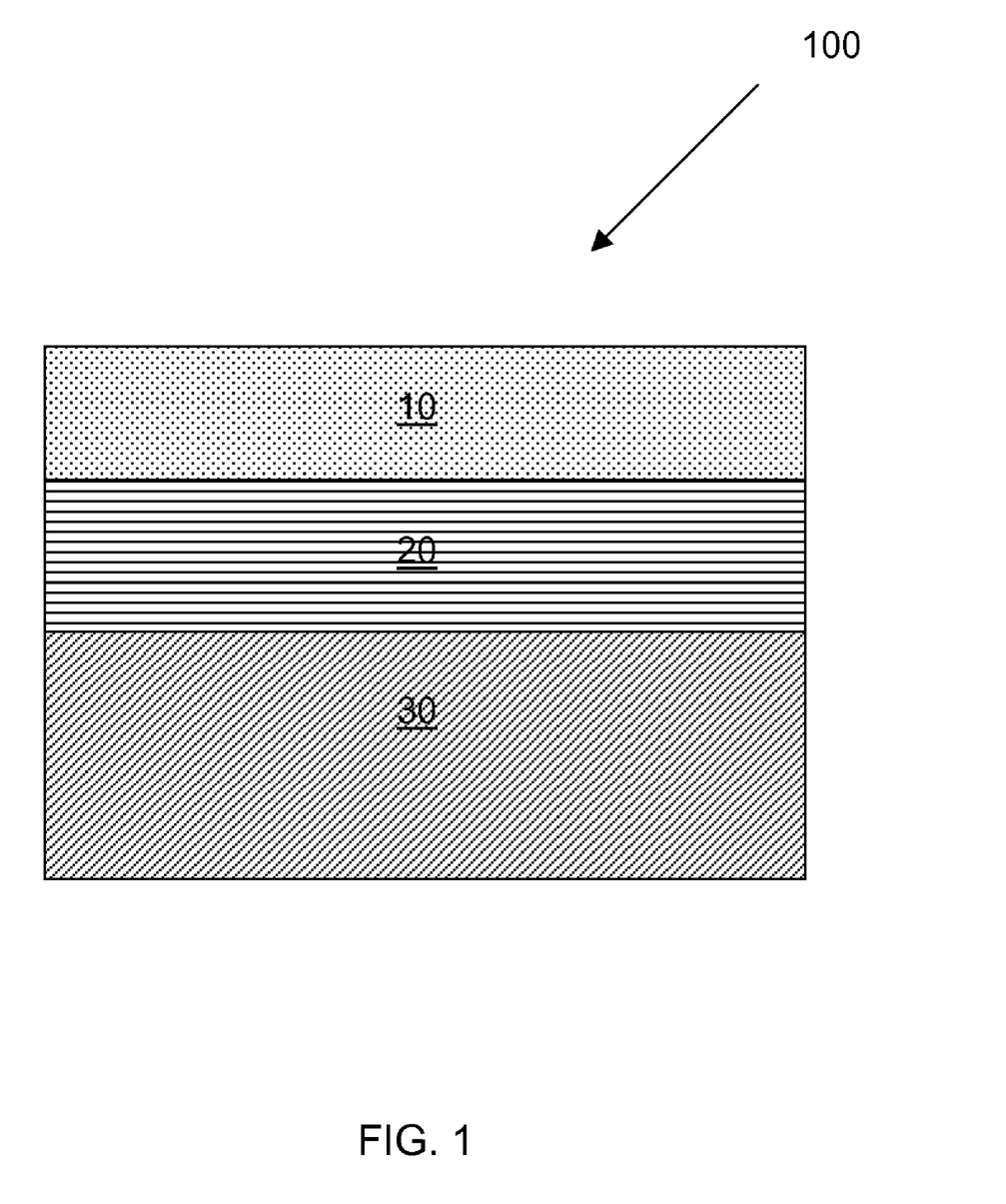
FIG. 1 is a schematic drawing that illustrates components of a fluid filter device according to an embodiment of the invention.

FIG. 1 shows a schematic drawing of a filter device 100 according to an embodiment of the present invention. The device includes a first filter component 10 which can give a visual indication of at least one contaminant in the source water. The first filter component 10 can be made of any materials that are safe for drinking water or food contact and that have appropriate porosity and hydrophilicity both to filter particulate contamination and to allow a sufficient liquid flow rate through the filter device 100. The first filter component 10 can include one or more subcomponents. We define "sufficient liquid flow rate" to mean an average flow rate greater than about 0.05 liters per minute when averaged over the passage of one liter of liquid through a filter device.

In some arrangements, the first filter component 10 has a very light or white color before use and can filter out and collect particulate contamination from the water. As particles are collected, the color of the first filter component 10 darkens, thus indicating that the source water contained particles that have been removed. The first filter component 10 can also include agents that undergo color-change reactions in the presence of particular organic or inorganic contaminants as will be discussed in more detail below.

The first filter component 10 can be configured in any number of ways. Examples include a flat sheet, dome, inverted dome, cone, inverted cone, pleats, and other bent, angled, twisted or convoluted topographies.

In some embodiments first filter component materials that can catch particles 1.0 μm in size and larger are used. In other embodiments first filter component materials are treated to improve particle capture and can catch particles as small as 1.0 nm. Suitable materials for the first filter component 10 include polyester, nylon, rayon, wood pulp, hydrophilized polypropylene, hydrophilized polyethylene, hydrophilized PBT (polybutylene terephthalate), hydrophilized Teflon™, and combinations thereof. In some arrangements a porous polyester-polyethylene bi-component material can be used.

One example of a suitable material for first filter component 10 is Unitherm 300, a polyester/polyethylene bi-component material manufactured by Midwest Filtration Company. The material has a basis weight of 3.0 oz/yd$^2$, a nominal thickness of 15 mils. Another example of a suitable material for first filter component 10 is Sontara®, a rayon/polyester blend material manufactured by DuPont. Sontara® has a basis weight of 2.3 oz/yd$^2$, a nominal thickness of 29 mils. Another example of a suitable material for first filter component 10 is Dexter 11681 which is a lightweight, two-phase, heatsealable tissue made of a blend of thermoplastic fibers, abaca, and cellulosic fibers. The basis weight of Dexter 11681 is 24 gsm and the thickness is 107 μm.

In one embodiment materials for the first filter component 10 can be chosen based on their water pass rates. Materials that allow water to pass through at a rate greater than 1 μm/sec with a pressure of approximately 1 atm can be used.

Filters made of polymers such as polypropylene, polyethylene, PBT (polybutylene terephthalate), and Teflon™ are hydrophobic in nature and are not likely to have water pass rates greater than 1 μm sec at 1 atm unless they have extremely large pore sizes. Hydrophobic polymers can be treated to become more hydrophilic and thus increase their water pass rates. One treatment includes first oxidizing the material and then attaching polar molecules. Other treatments include corona surface treatment. In other arrangements hydrophobic polymers can be combined with more hydrophilic copolymers to make suitable filter materials.

Improved particle capture can be achieved by adding polar or ionic molecules to the surface of the first filter component 10. Examples of agents that can improve particle capture include metal hydroxides (e.g., magnesium hydroxides), metal oxides, Lupasol® P, a homopolymeric polyethyleneimine manufactured by BASF Corporation of Mount Olive, N.J., and Acusol 445N, an acrylic homopolymer manufactured by Rohm and Haas of Knoxville, Tenn.

Filter device 100 also includes a second filter component 30 that is positioned downstream from first filter component 10, which is to say that source water passing though the filter device 100 passes through second filter component 30 after passing through first filter component 10. Second filter component 30 can include any number of purification agents that remove contaminants by chemical or physical means. Purification agents having porous, non-porous, granular, fibrous, filamentous, and particulate forms can be used. The agents can remove contaminants from water through adsorption, chemical reaction and size exclusion. Examples of purification agents include natural and synthetic zeolites, ion exchange resins, activated carbons, metal oxides, metal hydroxides, pyrolized synthetic materials and mechanical filtration media. In an exemplary embodiment, a mixture of about 40% activated carbon granules and about 60% weak acid ion exchange resin beads is used. Other examples of useful purification agents have been disclosed by Hankammer in U.S. Pat. Nos. 4,895,648 and 4,969,996, the disclosures of which are incorporated by reference herein. The purification agent(s) in the second filter component 30 can be in the form of loose media, a solid porous block, or combinations thereof. In the case of loose media, the first filter component 10 can also serve to prevent escape of material from the second filter component 30 into the source water. The second filter component 30 can include one or more subcomponents as may be useful for particular filtering needs.

In some arrangements the second filter component 30 contains carbon granules which, of course, are black. As discussed above, the first filter component 10 can be a very light or white color initially. If the first filter component 10 is over a black or dark second filter component 30, the dark color may show through or stain the first filter component 10. In some embodiments there is a intervening porous layer 20 interposed between the first filter component 10 and the second filter component 30, which can serve as a color barrier between the first filter component 10 and the second filter component 30. If the intervening porous layer 20 is light in color, it can mitigate the color effects on the first filter component 10 from the second filter component 30.

Gaps inside the filter device 100 can fill with air easily, and the air can become trapped. When air becomes trapped in the filter in a gravity-flow water treatment system, the flow of water can be blocked. In some arrangements it is difficult to make good initial physical contact between the first filter component 10 and the second filter component 30, and gaps can result. In other arrangements gaps can form between the first filter component 10 and the second filter component 30 as the media of the second filter component 30 settles during use. Some embodiments of the present invention include an intervening porous layer 20 between the first filter component 10 and the second filter component 30 to mitigate air trapping. The intervening porous layer 20 can be made of any material that is safe for drinking water or food contact and is hydrophilic. In some arrangements the intervening porous layer 20 can be a batting made of cotton, rayon, polyester, nylon, wood pulp, polymers, or fiberglass. An example of a suitable material for the intervening porous layer 20 is High Q 100% Cotton manufactured by Burkhart of North Carolina. In another arrangement a layer of fine mesh, hydrophilic beads can be used as the intervening porous layer 20. One example material is Dowex ion exchange resin, manufactured by The Dow Chemical Company of Midland, Mich.

Figure 2:
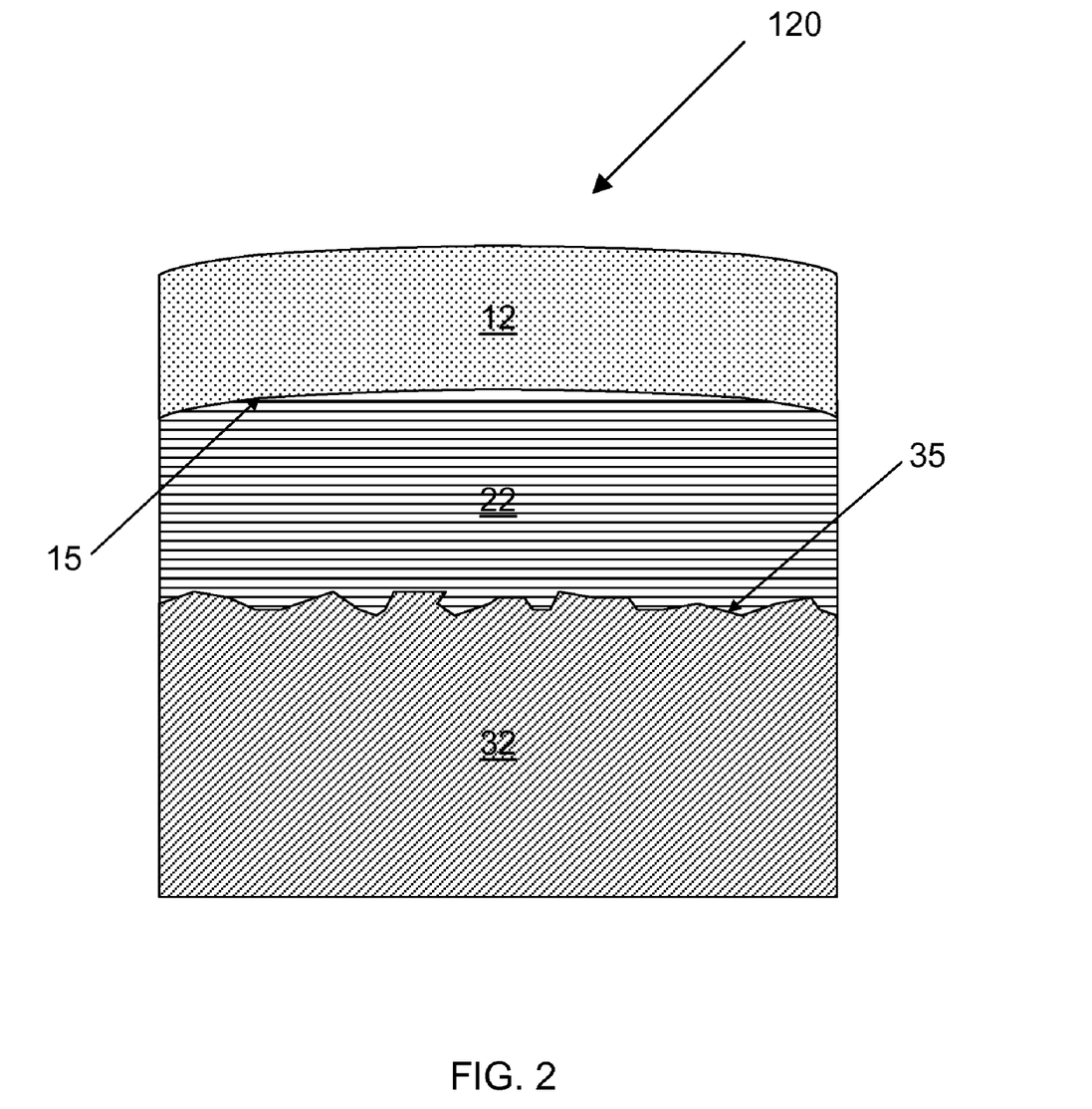
FIG. 2 is a schematic drawing that illustrates an ideal fit among components of a fluid filter device according to an embodiment of the invention.

FIG. 2 shows an illustrated embodiment in which a filter device 120 has a intervening porous layer 22 that is thick and flexible enough to conform to both a curved lower surface 15 of a first filter component 12 and an irregular upper surface 35 of a second filter component 32. FIG. 2 illustrates an ideal case where conformity is complete. In some arrangements the conformity may not be complete but may be sufficient to prevent significant trapping of air. In some arrangements the intervening porous layer 22 can adjust, i.e., expand and compress, to maintain conformity with the lower surface 15 of first filter component 10 and with the upper surface 35 of the second filter component 30 even as the surfaces 15, 35 shift and settle during use.

Water treatment systems that rely on pressure from a water supply to drive water through a filter device can tolerate a wider variety of filter materials and pore sizes than can gravity-driven systems. Typical head pressures in pressure-driven systems range from about 20 psi to about 120 psi. There is enough force to push water through even highly hydrophobic filter components and past trapped air bubbles.

Gravity-driven water treatment systems rely on the force of gravity to move water through a filter device. Typical head pressures in these systems are between about 0.01 psi and 1.00 psi, so it is difficult for water to move through filter components with sufficient flow rates unless the components are sufficiently hydrophilic. In some cases trapped air bubbles or hydrophobic filter components can prevent water flow altogether. We have defined "sufficient liquid flow rate" to mean an average flow rate greater than about 0.05 liters per minute when averaged over the passage of one liter of liquid through a filter device. First filter component materials that allow water to pass through at a rate greater than 1 μm/sec at a pressure of approximately 1 atm are consistent with achieving a sufficient liquid flow rate.

Figure 3A:
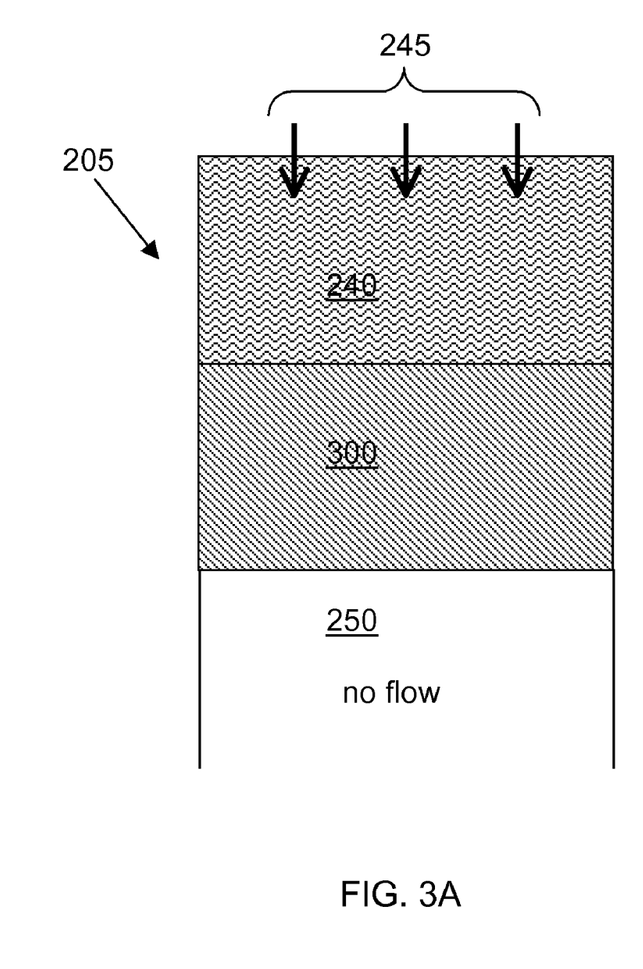
FIG. 3A is a schematic drawing that illustrates how water cannot pass through a hydrophobic filter device from the force of gravity alone.
Figure 3B:
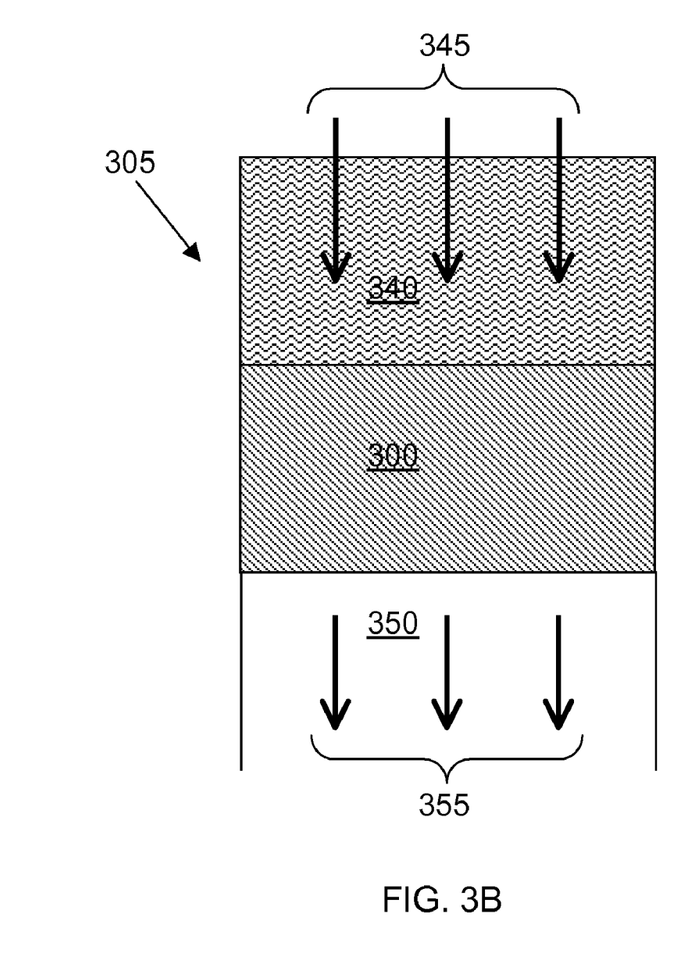
FIG. 3B is a schematic drawing that illustrates passage of pressurized water through a hydrophobic filter device.

FIGS. 3A and 3B give a schematic illustration of the relative filter hydrophobicity tolerance for gravity-driven and pressure-driven water treatment systems. In FIGS. 3A and 3B the lengths of the arrows 245, 345, 355 give an approximate relative indication of pressure magnitudes.

FIG. 3A shows a gravity-driven water treatment system 205 that contains a hydrophobic filter device 300. Source water 240 above the filter device 300 is driven into the filter device 300 by a pressure 245, due to the force of gravity. The source water 240 cannot flow through the filter device 300 and no treated water 250 emerges from the filter device 300. Examples of gravity-driven water treatment systems include pitchers that have two water containers in fluid communication with one another through a filter device, water dispensers suitable for use in refrigerators, water coolers with and without heating modules, portable filtered drinking devices such as water bottles, and various beverage making apparatus.

FIG. 3B shows a pressure-driven water treatment system 305 that contains the same hydrophobic filter device 300. Source water 340 comes through a water line (not shown) and is driven into hydrophobic filter device 300 by pressure 345 from the water line. The source water 340 flows readily through the filter device 300. Treated water 350 emerges from the filter device 300 with an exit pressure 355.

Figure 4:
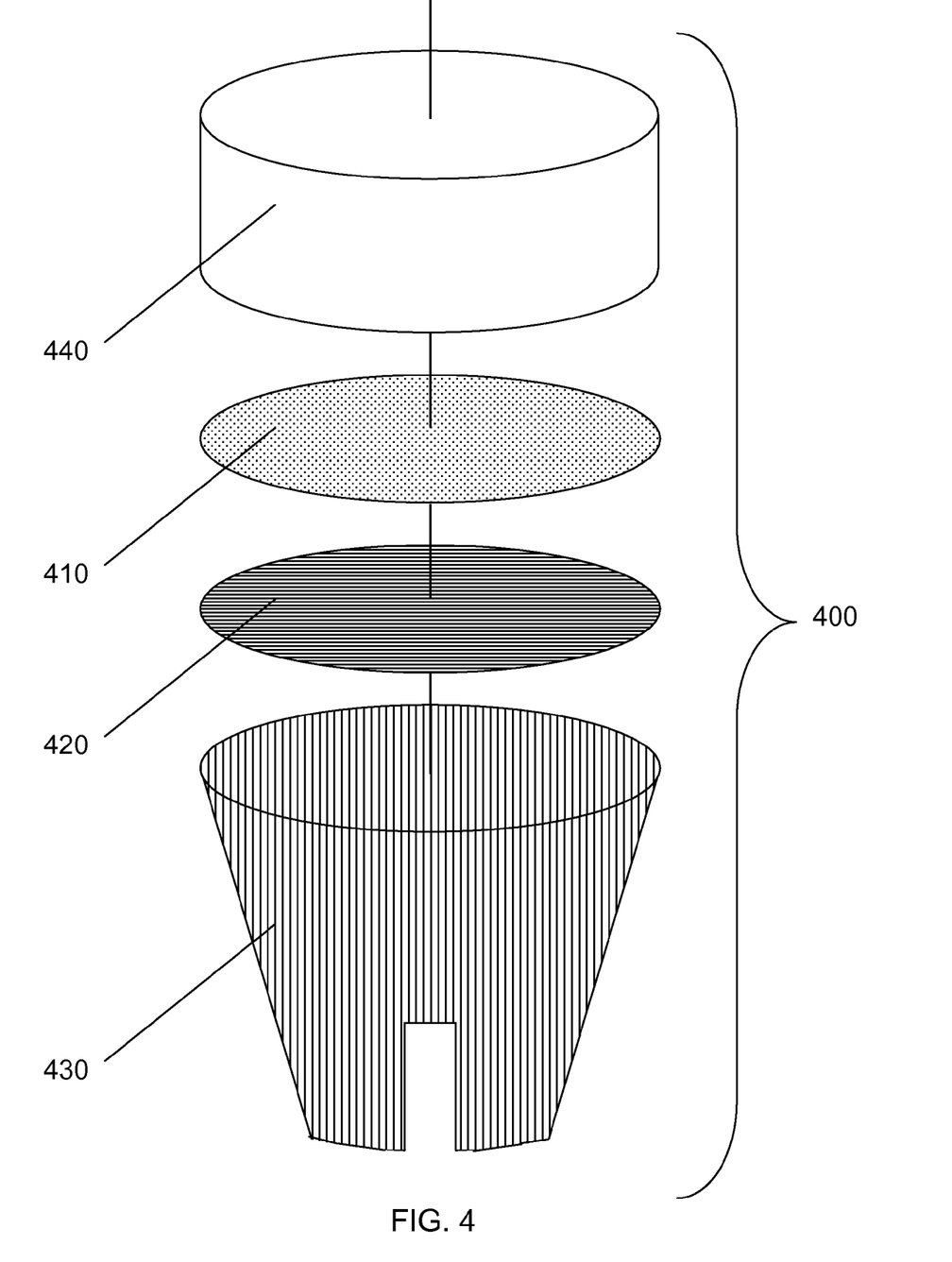
FIG. 4 is an exploded view of components of a fluid filter device.

FIG. 4 shows an exploded, perspective view of a gravity-driven filter device 400 according to an embodiment of the invention. The device 400 has a first filter component 410, a second filter component 430, and an optional intervening porous layer 420 as have been discussed above in reference to FIGS. 1 and 2. The device 400 can include also an optional cap 440 that is substantially transparent either wholly or in part. "Substantially transparent" is used to mean either transparent or close enough thereto (e.g., translucent, but nearly transparent) that it is possible to see though the cap 440 to determine a color change in the first filter component 410. The cap 440 may be made of one substantially transparent material or may be made of two or more materials as long as one material is substantially transparent and provides a good viewing window onto first filter component 410. Substantially transparent materials appropriate for the cap 440 include silica glass, fused quartz, and plastics such as polycarbonate, polystyrene, styrene, NAS® (styrene methylmethacrylate copolymer), SAN (styrene-acrylonitrile copolymer), PET (polyethylene terephthalate), PET-G (polyethylene terephthalateglycolate), and copolymers thereof. NAS® is available from NOVA Chemicals Corporation of Moon Township, Pa.

The cap 440 also includes one or more openings to allow source water to flow into the filter device 400 and to allow air to escape from the filter device 400. Most caps in gravity-flow filters have a very large number of small openings to allow water to flow into the filter and air to flow out of the filter without allowing the filtering media to escape. There is more flexibility in the design of openings in the cap 440, as the filtering media can be retained within the second filter component 430 by first filter component 410. In some arrangements, openings in cap 440 can be very large. In other arrangements, there is no cap 440, and the first filter component 410 forms the uppermost portion of the gravity-driven filter device 400.

Chemical treatment to remove dissolved and microscopic contaminants can be an important part of water purification. It would increase consumer satisfaction to have an indication of the kinds of contaminants that are being removed from source water. contaminants of interest include organics, inorganics, bacteria, and viruses. In one embodiment of the invention a prefilter is treated with an agent that can undergo a color-change reaction when it comes into contact with a particular contaminant in the source water. In another embodiment a prefilter is treated with a variety of agents that can respond to a variety of contaminants or to a variety of concentrations of a contaminant or combinations thereof. Table I gives a list of example agents that can respond to inorganic contaminants and can be used on a first filter component. Table II gives a list of example agents that can respond to organic contaminants and can be used on a first filter component. References to U.S. Patents and U.S. Patent Application Publications are given where appropriate. All references in Tables I and II are hereby incorporated in their entirety herein.

TABLE II

Color-Chance Agents for Organic Targets

| Agent | Target | Color Change |
|---|---|---|
| P-Nitrophenyl-B-D-Glucopyranosiduronic Acid | E. coli (B-glucuronidase) | Yellow |
| Blue-Tainted Polydiacetylene | E. coli toxin | Red |
| Ferrocytochrome | NR (Nitrate reductase) E. coli | Red |
| Anti-E. coli Antibody Colloidal Gold | E. coli toxin | Colored Band |
| Iodine-Starch Complex U.S. Pat. No. 5,264,346 | β-Lactam Antibiotics | Blue → Colorless |
| DMP - N,N-dimethyl-p-phenylenediamine, TMP—N,N,N',N'-tetramethyl-p-phenylenediamine | Cyctochrome Oxidase (Neisseria Gohorreha) | Pink Purple |
| TMB - 3,3',5,5'-tetramethylbenzide U.S. Pat. No. 5,264,346 | | Blue |
| X-Gal 5-Br-4-Cl-3-indoly 1 -β-D-Galactopyranoside U.S. Pat. No. 5,194,374 | Enterobacteriaceae (β-galactesidase) | Green |
| Biosensing compounds as described in U.S. Pat. No. 5,210,022, WO 01/06000, WO 98/55644, WO 00/65096 | Coliforms, E. coli, Aeromonas, Salmonella, Shigella, and others | Various |

In another arrangement, a test strip can be used in conjunction with or as part of the first filter component. Exemplary test strips are sold under the name Quantofix® by Fluka of Switzerland and are available from Sigma-

TABLE I

Color-Chance Agents for Inorganic Targets

| Agent | Target | Color Change |
|---|---|---|
| Lupasol ®, Zelite, Ion Exchange Resin | Copper | Blue |
| Eriochromcyanine R, Chromazurol S, B U.S. Pat No. 6,627,448 | Iron ($Fe^{2+}$, $Fe^{3+}$) | Dark Red |
| Copper Strip, Copper Metal Powder U.S. Pat. No. 4,746,616 | Arsenic | Red → Black, Brown |
| Zinc Powder U.S. Pat. No. 4,746,616 | Strychnine | Silver → Rose Red |
| Ratio of ions - R = $Fe^{3+}$:$Fe^{2+}$ U.S. Pat. No. 4,746,616 | Cyanide | R = 50:1 - Dark Blue R = 2:1 - Olive Green |
| Arsenazo III (Sigma Aldrich) Cresol Phthalein Complexone U.S. Pat. No. 6,342,037 | Calcium | Purple |
| Carminic Acid | Alkalinity—Hydroxide Ion ($OH^-$) Acidity—Hydronium Ion ($H_3O^+$) | Color change occurs over range: pH 4 → pH 7 |
| Iodine, Iodide | Lead | Bright Yellow |
| Iodine, Iodide | Arsenic | Orange-Red |
| Combined A + B A) Complexer - Macrocyclic Crown Ether (diazo 18-crown-6-ether) B) Indicator - Colorimetric Phradydazoresorcinol C) $Fe^{3+}$Ion U.S. Pat. No. 2002/0187558 | Antimony, Arsenic, Bismuth, Cadmium, Chromium, Cobalt, Lead, Nickel, Mercury, Selenium, Tin, Zinc | Yellow → Red (Lead) |
| Silver Dichromate U.S. Pat. No. 5,229,299 | Chloride Ion (salt) | Brownish Black |

Aldrich. Table III lists target contaminants and the color changes they effect for various Quantofix® test strips.

TABLE III

Quantofix ® Color-Change Test Strips

| Sigma-Aldrich Catalog Number | Target | Color Change |
| --- | --- | --- |
| 37207 | Aluminium | pink → red |
| 37203 | Ascorbic Acid | yellow → bluish green |
| 37208 | Chlorine | white → blue |
| 37209 | Chromate | pink → violet |
| 37199 | Cobalt | white → greenish blue |
| 37198 | Coppei | white → red violet |
| 37197 | Nickel | white → red |
| 37204 | Nitrate (Nitrite) | white → pink |
| 37205 | Nitrite | white → pink |
| 37206 | Peroxide | white → blue |
| 37210 | Phosphate | white → greenish blue |
| 37202 | Potassium | yellow → orange |
| 37196 | Silver (Ag Fix) | ochre → brown yellow → blue |
| 37201 | Sulphite | white → pink |
| 37195 | Tin | white → blue |
| 37194 | Water Hardness - Aquadur ® | turquoise → pink |
| 37193 | Water Hardness - Aquadur ® | turquoise → pink |

Figure 5A:
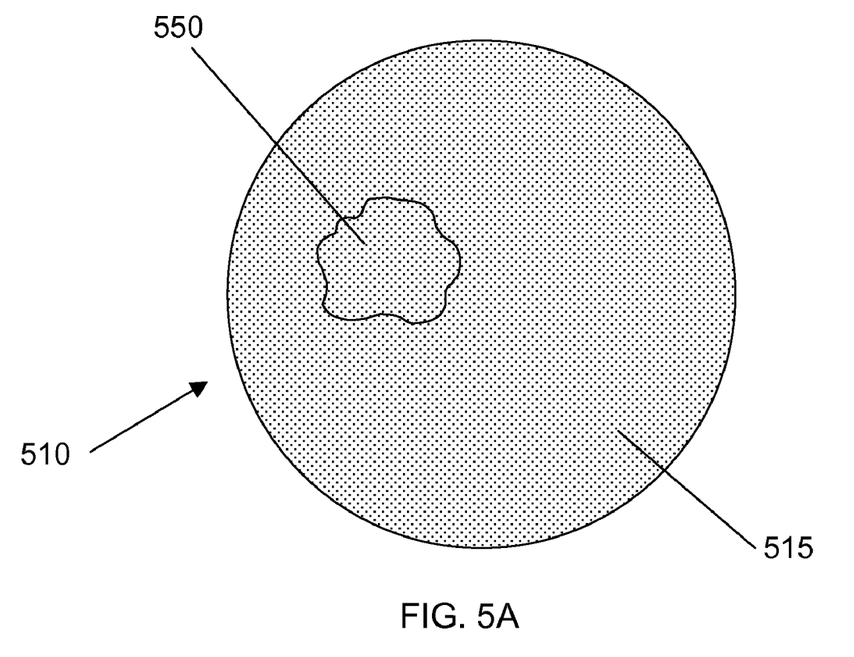
FIG. 5A is a plan view of a first filter component with an indicator region that can change color in response to a target contaminant.

FIG. 5A shows an exemplary embodiment of a first filter component 510 that includes a porous filter material 515 and an indicator region 550 containing one or more agents that can undergo color-change reactions in response to one or more target contaminants. The region 550 can take any shape and can be located anywhere on the porous filter material 515. In other arrangements, the region 550 can be a test strip associated with the first filter component 510. That is to say that a test strip can lie on or near or be attached to the first filter component 510 in such a way that the test strip receives similar exposure to source water as the first filter component 510. There can be any number, n, of regions 550-1-550-n, each containing one or more agents that can undergo color-change reactions in response to one or more target contaminants, on or associated with porous filter material 515. In a gravity-driven filter device, such as the one shown in FIG. 4, the region 550 is arranged to be visible through the optional cap 440, and the porous filter material 515 is hydrophilic. In a pressure-driven water filter device (not shown) the region 550 is arranged to be visible through the outer housing of the device and the porous filter material 515 can be hydrophobic. In the unused condition shown in FIG. 5A the region 550 can have a color characteristic of the agent(s) before exposure to the target contaminant(s). In some arrangements, the agent(s) can have the same color as the porous filter material 515. In other arrangements, the agent(s) can have a color different from the porous filter material 515.

Figure 5B:
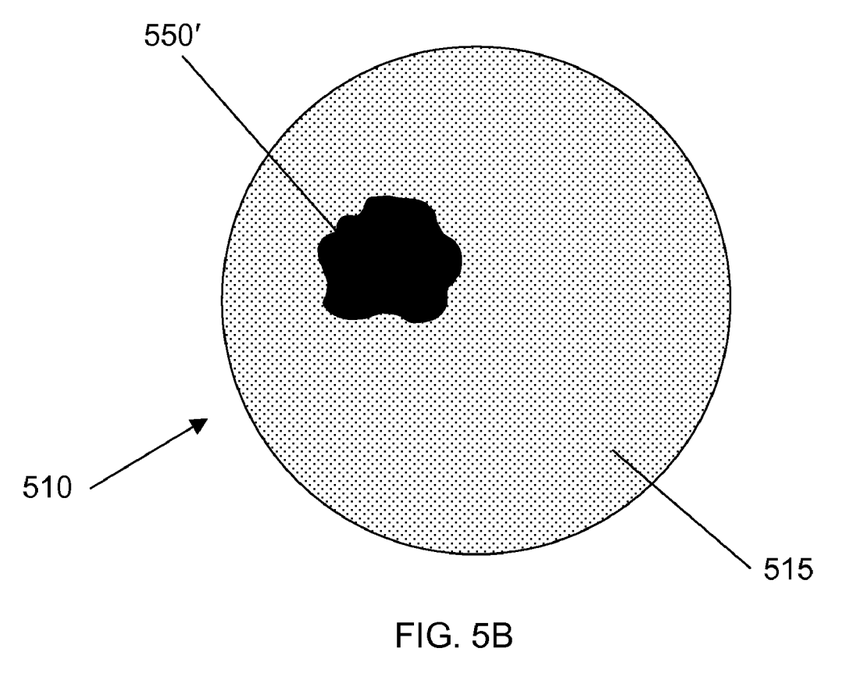
FIG. 5B shows the indicator region of FIG. 5A after exposure to water containing a target contaminant.

FIG. 5B shows the first filter component 510 after it has been exposed to target contaminant(s). The agent(s) from region 550 in FIG. 5A have undergone a color-change reaction in response to target contaminant(s). Region 550 has changed in color and is labeled as region 550' in FIG. 5B. There is a correspondence between the color in region 550' and the contaminant(s) in the water. Information about contaminants and the color changes they can cause can be supplied to the consumer.

In other arrangements, the color-change agents can be positioned below the first filter component 510 as long as a change in color can be seen through the first filter component 510 and through the optional cap 440 (FIG. 4). The color-change agents can be incorporated into the intervening porous layer 420 (FIG. 4) or can be added as an additional layer (not shown) below the first filter component 510.

Figure 6A:
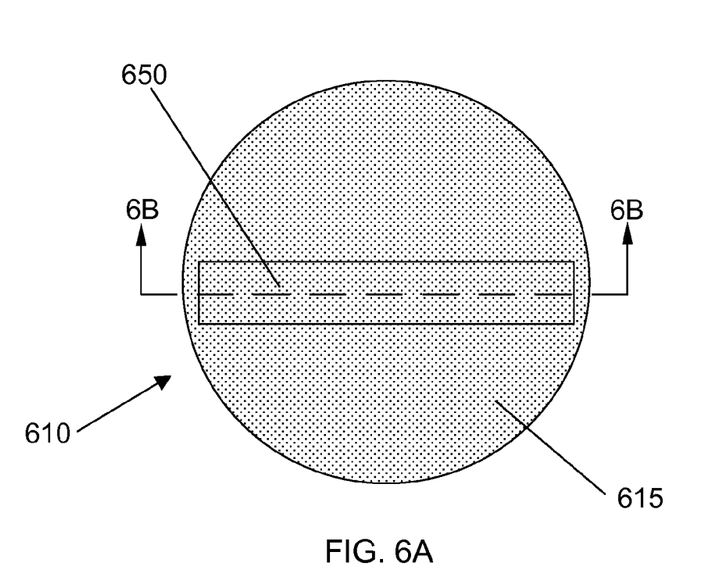
FIG. 6A is a plan view of a first filter component with an indicator region that can change color in response to a target contaminant.

FIG. 6A is a plan view of a first filter component 610 that includes a porous filter material 615 and an indicator region 650 containing one or more agents that can undergo color-change reactions in response to one or more target contaminants according to an exemplary embodiment of the invention. The region 650 need not be rectangular as shown in FIG. 6A but can take any shape. In a gravity-driven filter device, such as the one shown in FIG. 4, the region 650 is arranged to be visible through the optional cap 440 and the porous filter material 615 is hydrophilic. In a pressure-driven water filter device (not shown) the region 650 is arranged to be visible through the outer housing of the device and the porous filter material 615 can be hydrophobic.

Figure 6B:
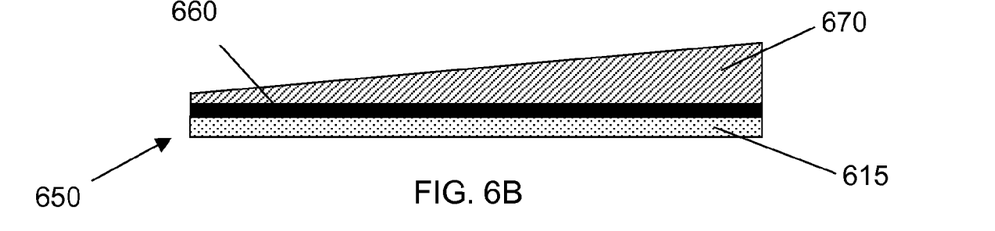
FIG. 6B is an enlarged, cross-section view of the indicator region of FIG. 6A as cut along line 6B-6B.
Figure 6C:
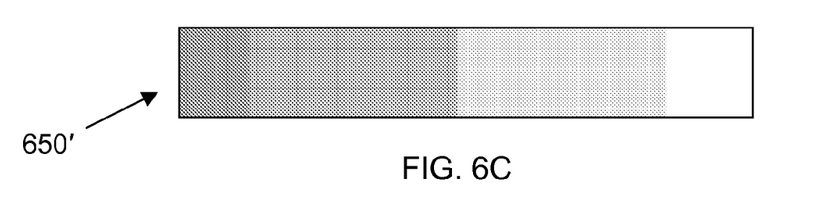
FIG. 6C shows the indicator region of FIG. 6A after several exposures to water containing a target contaminant.
Figure 6D:
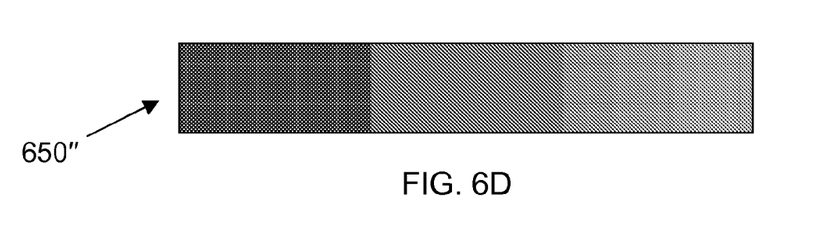
FIG. 6D shows the indicator region of FIG. 6C after further exposures to water containing a target contaminant.

FIG. 6B is a cross section of indicator region 650 of FIG. 6A as cut along the line 6B-6B. FIG. 6B shows the porous filter material 615 over which lies a layer of color-change agent 660. Over the color-change agent 660 there is a cover layer 670 made of a material that dissolves slowly in water and is compatible with drinking water applications. Suitable materials include films of starch, polyvinyl alcohol, and water soluble GRAS (generally recognized as safe) materials. The thickness of cover layer 670 increases from left to right in FIG. 6B. As water is poured through the first filter component 610, cover layer 670 begins to dissolve. After water has been poured through the first filter component 610 numerous times, cover layer 670 dissolves enough in the thinnest region on the left side of FIG. 6B to expose the color-change agent 660 to the source water. If the source water contains contaminant(s) that can undergo a color-change reaction with color-change agent 660, the indicator region 650' as shown in FIG. 6 becomes colored on the left side. At a later time, after water has been poured through the first filter component 610 many more times, the cover layer 670 dissolves further, and the color-change agent 660 is exposed farther to the right in FIG. 6B. The indicator region 650" as shown in FIG. 6D becomes more colored than it had been in FIG. 6B. Eventually, if it is exposed to enough water, the entire cover layer 670 can be dissolved, thus exposing all color-change agent 660. The entire exposed indicator region can have color of a uniform intensity (not shown).

Figure 7A:
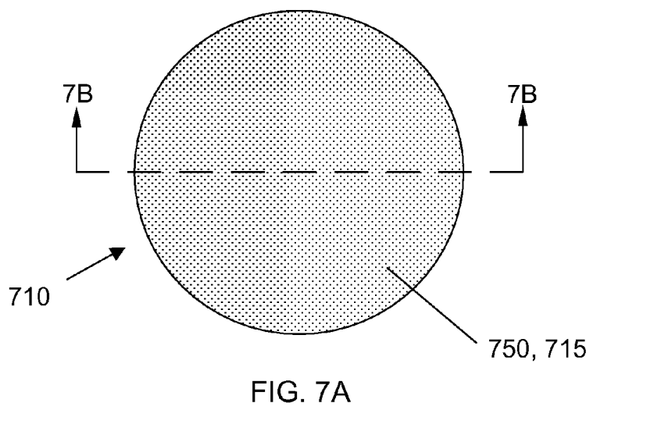
FIG. 7A is a plan view of a first filter component wherein the entire first filter component can change color in response to water containing a target contaminant.

FIG. 7A is a plan view of a first filter component 710 that includes a porous filter material 715 and an indicator region 750 containing one or more agents that can undergo color-change reactions in response to one or more target contaminants according to an exemplary embodiment of the invention. In FIG. 7A, the indicator region 750 covers substantially the entire surface of the first filter component 710. In a gravity-driven filter device, such as the one shown in FIG. 4, the region 750 is arranged to be visible through the optional cap 440 and the porous filter material 715 is hydrophilic. In a pressure-driven water filter device (not shown) the region 750 is arranged to be visible through the outer housing of the device and the porous filter material 715 can be hydrophobic.

Figure 7B:
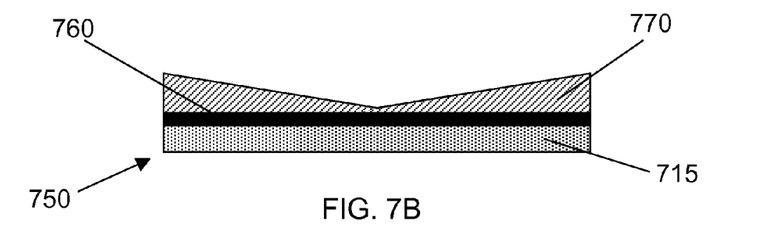
FIG. 7B is an enlarged, cross-section view of the first filter component of FIG. 7A as cut along line 7B-7B.
Figure 7C:
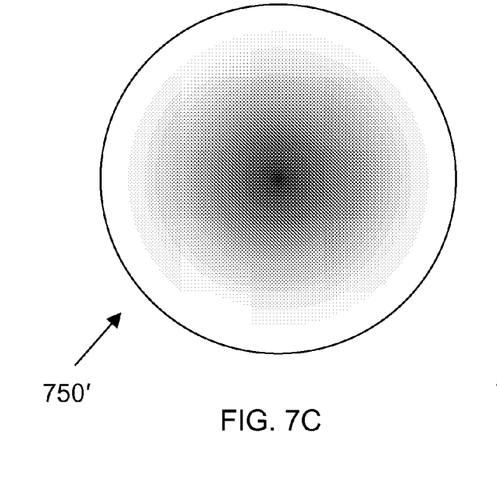
FIG. 7C shows the first filter component of FIG. 7A after several exposures to water containing a target contaminant.
Figure 7D:
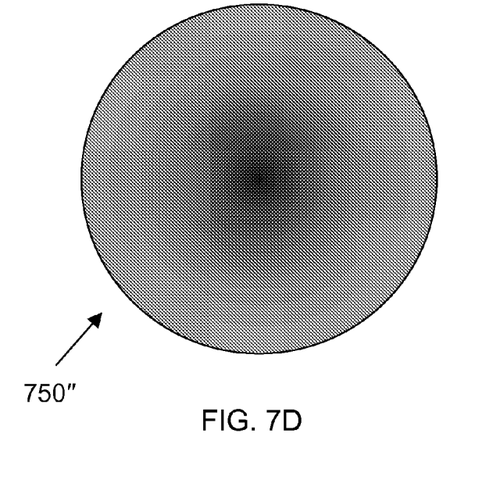
FIG. 7D shows the first filter component of FIG. 7C after further exposures to water containing a target contaminant.

FIG. 7B shows a cross section of the first filter component 710 as cut along line 7B-7B. FIG. 7B shows the porous filter material 715 over which lies a layer of color-change agent 760. The color-change agent 760 is coated with a cover layer 770 similar to cover layer 670 as shown in FIG. 6B. In FIG. 7B the cover layer 770 is thinnest in the center and increases in thickness as it gets closer to the edges. As discussed above in reference to FIGS. 6C, 6D, as the first filter component 710 comes into repeated contact with water, the thinnest parts of the cover layer 770 begin to dissolve. After some amount of water has been processed, the first filter component 710 appears as 750' shown in FIG. 7C. Later, when more water has passed through, the first filter component 710 appears as 750" shown in FIG. 7D. Eventually, if it is exposed to enough water, the entire cover layer 770 can be dissolved, thus exposing all color-change agent 760. The entire exposed indicator region can have color of a uniform intensity (not shown).

Figure 8A:
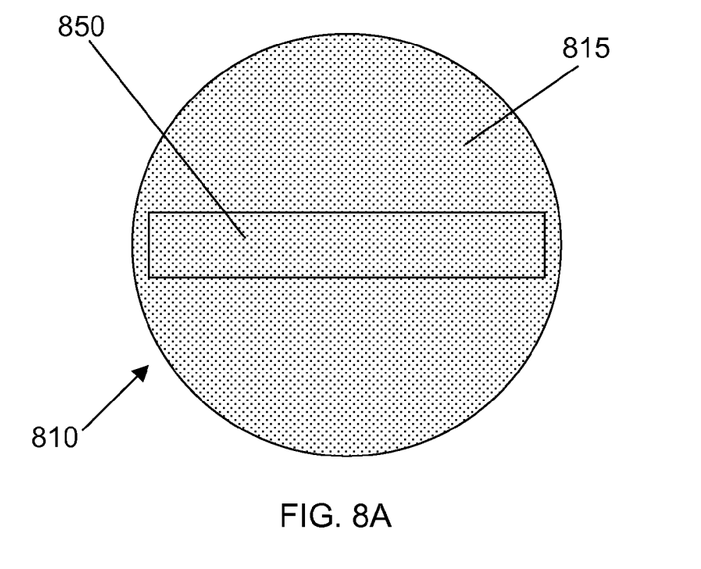
FIG. 8A is a plan view of a first filter component with an indicator region that can change color in response to a target contaminant.

FIG. 8A is a plan view of a first filter component 810 that includes a porous filter material 815 and an indicator region 850 containing one or more agents that can undergo color-change reactions in response to one or more target contaminants according to an exemplary embodiment of the invention. The region 850 need not be rectangular as shown in FIG. 8A but can take any shape. In a gravity-driven filter device, such as the one shown in FIG. 4, the region 850 is arranged to be visible through the optional cap 440 and the porous filter material 810 is hydrophilic. In a pressure-driven water filter device (not shown) the region 850 is arranged to be visible through the outer housing of the device and the porous filter material 815 can be hydrophobic.

Figure 8B:
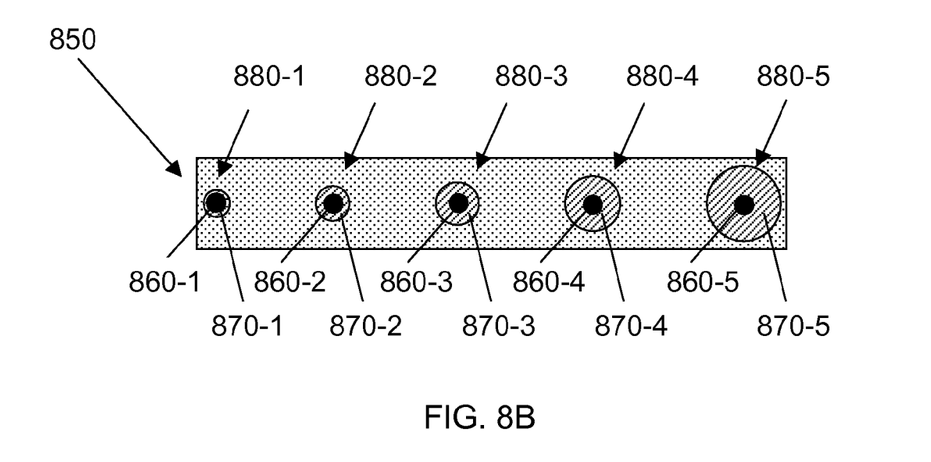
FIG. 8B is a enlarged view of the indicator strip of FIG. 8A showing representative microcapsules which contain a color-change agent according to an embodiment of the invention.

FIG. 8B is a enlarged schematic view of the indicator region 850 of FIG. 8A. Representative microcapsules 880-1-880-5 are arranged across the length of the region 850. Of course, the microcapsules are microscopic, and there are thousands or more microcapsules 880-1-880-n across the length of the region 850. Each microcapsule 880-1-880-5 contains a center portion of color-change agent 860-1-860-5, respectively. In the embodiment shown in FIG. 8B, the center portions of color-change agent 860-1-860-5 are about the same size in each microcapsule 880-1-880-5. The walls 870-1-870-5 of the microcapsules 880-1-880-5, respectively, vary in thickness. The thinnest is wall 870-1, the thickest is wall 870-5, and the walls increase in thickness from left to right along strip 850. The walls 870-1-870-5 are made of a material that dissolves slowly in water and is compatible with drinking water applications. Suitable materials films of starch, polyvinyl alcohol, and water soluble GRAS (generally recognized as safe) materials. As water is poured through the first filter component 810, the walls 870-1-870-5 of the microcapsules 880-1-880-5, respectively, begin to dissolve. After water has been poured through the first filter component 810 numerous times, the walls 870-1 of the microcapsules 88-1 are breached, and the color-change agent 860-1 is exposed to the source water. The color-change agent 860-1 changes color if target contaminants are present. At a later time, after water has been poured through the first filter component 810 many more times, the walls of microcapsules 880-2 are breached. The color-change agents 860-2 are exposed to the source water, and undergo a color change in the presence of target contaminants.

Figure 8C:
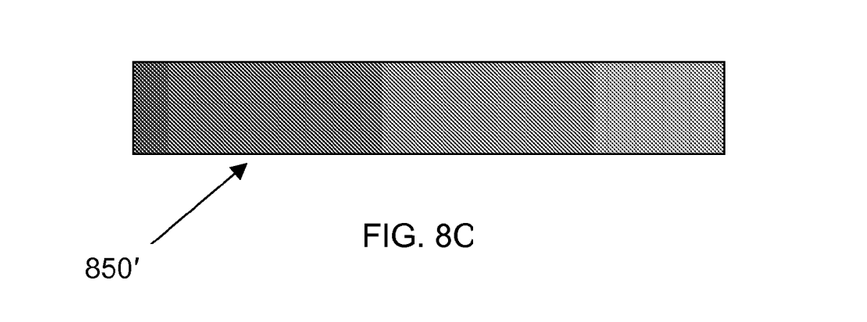
FIG. 8C shows the indicator strip of FIG. 8A after many exposures to water containing a target contaminant.

The color-change reaction proceeds across the indicator strip 850 as more and more water is poured through the first filter component 810. At some later time, the indicator strip 850 is colored approximately as shown by 850' in FIG. 8C with the deepest color in the region that contained the thinnest-walled microcapsules and the lightest color in the region that contained the thickest-walled microcapsules. The absolute thicknesses of the microcapsule walls can be chosen for each particular filter device application. Consideration can include volume, temperature, and pressure of the water that passes through the filter device during its lifetime.

The examples of FIGS. 5-8 is illustrate just a few of the way in which a progression of exposure to contaminants can be shown as a water filter device is used.

Figure 9:
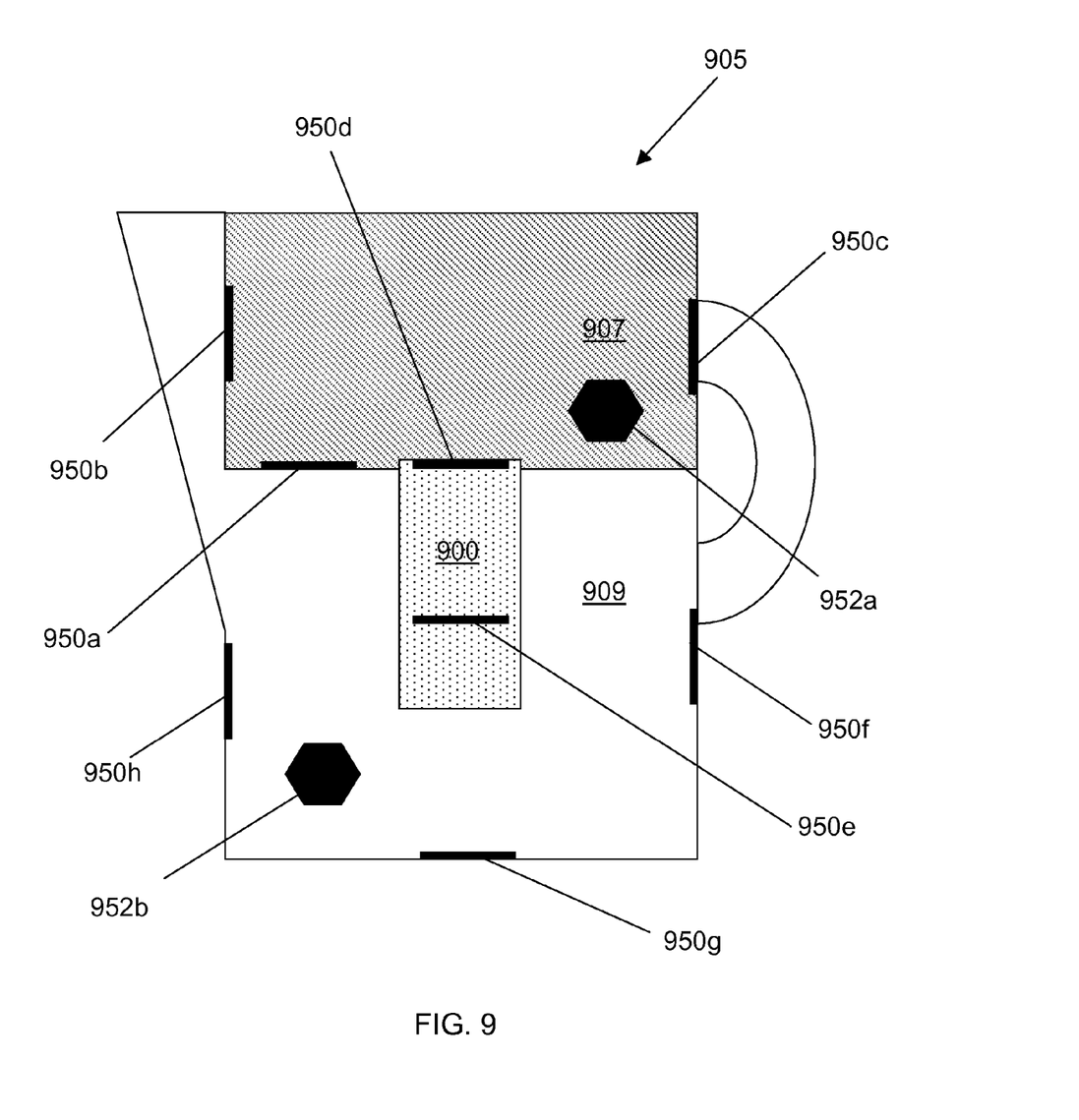
FIG. 9 is a schematic side view of a water treatment system showing exemplary positions for indicator components according to an embodiment of the invention.

FIG. 9 shows a schematic side view of a water treatment system 905 to illustrate other ways in which color-change agents can be used to indicate the presence of contaminants. In this exemplary embodiment, the water treatment system 905 is a gravity-flow pitcher with a filter device 900 connecting a first liquid container 907 with a second liquid container 909. The first liquid container 907 receives source water and the second liquid container 909 holds treated water after it has flowed through the filter device 900.

In FIG. 9 a number of possible contaminant indicator components 950a-950h, 952a, 952b are shown inside the first liquid container 907, inside the second liquid container 909, and on the filter device 900. The indicator components 950a-950h, 952a, 952b contain at least one color-change agent. Examples of color-change agents are listed above in Tables I, II, and III.

The indicator components 950a-950h can be made of any material that is safe for drinking water or food contact and to which the color-change agent(s) can adhere. Possible materials include polyester, nylon, rayon, wood pulp, polypropylene, polyethylene, PBT (polybutylene terephthalate), Teflon™, thermoplastic fibers, abaca, cellulosic fibers, and combinations thereof. The indicator components 950a-950h can have any shape and can include water-soluble coatings as has been discussed above in reference to FIGS. 5-8. The indicator components 950a-950h can attach to the inner surfaces of the water treatment system 905 in a variety of ways such as gluing, using a hook and loop fastening system, and providing brackets inside the water treatment system 905 into which the indicator components 950a-950h can slide or snap.

The number and placement of n indicator components 950-1-950-n can be chosen by the consumer or can be built-in during manufacture of the water treatment system 905. A number of possible positions are shown in FIG. 9. Indicator components 950a, 950b, 950c have been placed along the interior walls of the first liquid container 907. Indicator component 950d has been placed on the exterior surface of the filter device 900 on a portion of the filter device 900 that is within the first liquid container 907. Indicator components 950a-950d are positioned for exposure to source water and therefore can undergo color-change reactions in response to target contaminants that may be removed later by the filter device 900 during treatment.

Indicator components 950f, 950g, 950h have been placed along the interior walls of the second liquid container 909. Indicator component 950e has been placed on the exterior surface of the filter device 900 on a portion of the filter device 900 that is within the second liquid container 909. Indicator components 950e-950h are positioned for exposure to treated water after it has flowed through the filter device 900. Indicator components 950e-950h can undergo color-change reactions in response to target contaminants that still remain in the water after treatment by the filter device 900.

Exemplary indicator components 952a, 952b are not attached to the water treatment system 905, but are free to move around in first liquid container 907 and second liquid container 909, respectively. Indicator components 952a, 952b can have any shape such as round, cubic, lenticular, etc. as long as they do not interfere with source water reaching the inlet portion of the filter device 900 or treated water leaving the outlet portion of filter device 900. Indicator components 952a, 952b are free standing and contain at least one agent capable of undergoing a color-change reaction in response to a target contaminant. The color-change agent(s) can be coated onto suitable materials as have been listed above in other color-change indicator embodiments. The indicator components 952a, 952b can be made of such materials formed into suitable shapes or can include a framework upon which or within which such materials are disposed. The indicator components 952a, 952b are most useful to the consumer when source water and/or treated water can make contact with the components 952a, 952b and when color changes that may occur as a result of the contact can be viewed by the consumer.

In some arrangements a first indicator component for a particular target contaminant is placed in the first (source) liquid container and a second indicator for the same target contaminant is placed in the second (treated) liquid container. By observing and comparing color changes in the first and second indicator components, consumers can have a direct indication of removal of the particular contaminant. If neither the first nor the second indicator component changes color, the consumer will know that the particular contaminant was not present in the source water. If the first indicator component changes color and the second indicator component does not change color, the consumer will know that the particular contaminant was present in the source water and was removed by the treatment system. If both the first and the second indicator component change color, the consumer will know that the particular contaminant was present in the source water and was not removed by the treatment system.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A gravity-flow water treatment filter system, comprising:
   a first liquid container; and
   a filter device in communication and below the first container, the filter device comprising a first filter component capable of providing a user with a visual indication of device exposure to at least one contaminant, said first filter component having a curved lower surface, a second filter component having an irregular upper surface and a flexible intervening porous layer therebetween substantially conforming to both the curved lower surface and the irregular upper surface to prevent significant trapping of air between the first and second filter components in order to maintain flow therethrough, wherein said flexible intervening porous layer comprises a material capable of sufficient expansion and compression to substantially conform to the curved lower surface and the irregular upper surface, wherein an average flow rate greater than 0.05 liters per minute when averaged over the passage of one liter of liquid through the filter device is achieved with a liquid head pressure of less than about 1.0 psi; and
   a second liquid container configured such that the second liquid container receives liquid from the first liquid container after the liquid has passed through the filter device wherein the first liquid container and the second liquid container are disposed in a pitcher or a drinking bottle.

2. The gravity-flow water treatment filter system of claim 1, wherein the intervening porous layer comprises a material selected from the group consisting of cotton, rayon, nylon, wood pulp, polymers, and fiberglass.

3. The gravity-flow water treatment filter system of claim 2, wherein intervening porous layer comprises fine mesh hydrophilic beads.

4. The gravity-flow water treatment filter system of claim 1, wherein the first filter component comprises a hydrophilic porous material.

5. The gravity-flow water treatment filter system of claim 4, wherein the hydrophilic porous material has a water pass rate greater than about 1 µm/sec at a pressure of approximately 1 atm.

6. The gravity-flow water treatment filter system of claim 4 wherein the hydrophilic porous material is selected from the group consisting of polyester, nylon, rayon, wood pulp, hydrophilized polypropylene, hydrophilized polyethylene, hydrophilized PBT (polybutylene terephthalate), hydrophilized PTFE (polytetrafluoroethylene), thermoplastic fibers, abaca, cellulosic fibers, a porous polyester-polyethylene bi-component material and combinations thereof.

7. A gravity-flow water treatment system, comprising:
   a first liquid container;
   a filter device in communication with and below the first liquid container, said filter device comprising a first filter component having a curved lower surface, a second filter component having an irregular upper surface; and a flexible intervening porous layer therebetween substantially conforming to both the curved lower surface and the irregular upper surface to prevent significant trapping of air between the first and second filter components in order to maintain flow therethrough, wherein said flexible intervening porous layer comprises a material capable of sufficient expansion and compression to substantially conform to the curved lower surface and the irregular upper surface, and a first contaminant indicator element within the first liquid container, the element containing at least one agent capable of undergoing a color-change reaction in response to at least one contaminant, wherein an average flow rate greater than 0.05 liters per minute when averaged over the passage of one liter of liquid through the filter device is achieved with a liquid head pressure of less than about 1.0 psi; and
   a second liquid container configured to receive treated liquid from the first liquid container after the liquid has passed through the filter device wherein the first liquid container and the second liquid container are disposed in a pitcher or a drinking bottle.

8. The gravity-flow water treatment system of claim 7 wherein the first contaminant indicator element is attached to a wall of the first liquid container in a position in which the contaminant indicator element can come into contact with source liquid.

9. The gravity-flow water treatment system of claim 7 wherein the first contaminant indicator element is attached to the filter device.

10. The gravity-flow water treatment system of claim 7 wherein the first contaminant indicator element is able to move freely throughout the first liquid container.

11. The gravity-flow water treatment system of claim 7 wherein the color-change reaction occurs when the first filter component makes aqueous contact with an inorganic contaminant, an organic contaminant, a bacteria, a virus, or combinations thereof.

12. The gravity-flow water treatment system of claim 7, further comprising:
a second contaminant indicator element within the second liquid container, the element containing at least one agent capable of undergoing a color-change reaction in response to at least one contaminant.

13. The gravity-flow water treatment system of claim 12 wherein the second contaminant indicator element is attached to a wall of the second liquid container in a position in which the contaminant indicator element can come into contact with the treated liquid.

14. The gravity-flow water treatment system of claim 12 wherein the second contaminant indicator element is attached to the filter device.

15. The gravity-flow water treatment system of claim 12 wherein the second contaminant indicator element is able to move freely throughout the second liquid container.

16. The device of claim 12 wherein the color-change reaction occurs when the second contaminant indicator element makes aqueous contact with an inorganic contaminant, an organic contaminant, a bacteria, a virus or combinations thereof.

17. A gravity-flow water treatment system comprising:
an upper liquid container;
a filter device in communication with and below the upper liquid container; and
a lower liquid container configured such that the lower liquid container receives liquid from the upper liquid container after the liquid has passed through the filter device; said filter device comprising
a first filter component capable of providing a user with a visual indication of device exposure to at least one contaminant, said first filter component having a curved lower surface, a second filter component, said second filter component having an irregular upper surface, and a flexible intervening porous layer therebetween substantially conforming to both the curved lower surface and the irregular upper surface to prevent significant trapping of air between the first and second filter components in order to maintain flow therethrough;
wherein said flexible intervening porous layer comprises a material capable of sufficient expansion and compression to substantially conform to the curved lower surface and the irregular upper surface,
wherein an average gravity flow rate greater than 0.05 liters per minute when averaged over the passage of one liter of liquid through the filter device is achieved with a liquid head pressure of less than about 1.0 psi and wherein the upper liquid container and the lower liquid container are disposed in a pitcher or a drinking bottle.

18. The gravity-flow water treatment filter system of claim 17, wherein the filter device is integrated into a beverage-making apparatus.

19. The gravity-flow water treatment filter system of claim 17, wherein the intervening porous layer comprises a material selected from the group consisting of cotton, rayon, nylon, wood pulp, polymers, and fiberglass.

20. The gravity-flow water treatment filter system of claim 19, wherein intervening porous layer comprises fine mesh hydrophilic beads.

21. The gravity-flow water treatment filter system of claim 17, wherein the first filter component comprises a hydrophilic porous material.

22. The gravity-flow water treatment filter system of claim 21, wherein the hydrophilic porous material has a water pass rate greater than about 1 μm/sec at a pressure of approximately 1 atm.

23. The gravity-flow water treatment filter system of claim 21 wherein the hydrophilic porous material is selected from the group consisting of polyester, nylon, rayon, wood pulp, hydrophilized polypropylene, hydrophilized polyethylene, hydrophilized PBT (polybutylene terephthalate), hydrophilized PTFE (polytetrafluoroethylene), thermoplastic fibers, abaca, cellulosic fibers, a porous polyester-polyethylene bi-component material and combinations thereof.

* * * * *